United States Patent
Jiang (10) Patent No.: US 10,783,373 B2
(45) Date of Patent: Sep. 22, 2020

(54) METHOD AND APPARATUS FOR AUGMENTING REALITY

(71) Applicant: Baidu Online Network Technology (Beijing) Co., Ltd., Beijing (CN)

(72) Inventor: Zhilei Jiang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/505,268

(22) Filed: Jul. 8, 2019

(65) Prior Publication Data
US 2020/0012857 A1  Jan. 9, 2020

(30) Foreign Application Priority Data
Jul. 9, 2018  (CN) .......................... 2018 1 0743420

(51) Int. Cl.
*G06K 9/00* (2006.01)
*G06T 7/73* (2017.01)

(52) U.S. Cl.
CPC ............ *G06K 9/00671* (2013.01); *G06T 7/73* (2017.01); *G06K 2209/40* (2013.01)

(58) Field of Classification Search
CPC .. G06K 9/00671; G06K 2209/40; G06T 7/73; G06T 19/20; G06T 2219/2004; G06T 11/60
See application file for complete search history.

(56) References Cited

U.S. PATENT DOCUMENTS

| 2006/0034535 A1* | 2/2006 | Koch ........................ E02F 9/26 382/254 |
| 2012/0038671 A1 | 2/2012 | Min |
| 2015/0332504 A1 | 11/2015 | Wang |

FOREIGN PATENT DOCUMENTS

CN    107622241 A    1/2018

* cited by examiner

*Primary Examiner* — Haixia Du
(74) *Attorney, Agent, or Firm* — Nixon Peabody LLP (57) ABSTRACT

Embodiments of the present disclosure disclose a method and apparatus for augmenting reality. A specific embodiment of the method includes: acquiring outline data of a plurality of building blocks satisfying a preset selection condition, the outline data being used to describe an outline of a building block in three-dimensional space; generating reference information based on projected line segments of the plurality of building blocks; determining, based on the reference information, a target building block in the plurality of building blocks and a superimposed region in an image acquired by the terminal, labeling information of the target building block being superimposed on the superimposed region; and superimposing the labeling information of the target building block on the determined superimposed region, to obtain an augmented reality image.

15 Claims, 4 Drawing Sheets

METHOD AND APPARATUS FOR AUGMENTING REALITY

CROSS-REFERENCE TO RELATED APPLICATIONS

This application claims priority to Chinese Patent Application No. 201810743420.7, filed with the China National Intellectual Property Administration (CNIPA) on Jul. 9, 2018, the content of which is incorporated herein by reference in its entirety.

TECHNICAL FIELD

The present disclosure relates to the field of computer, specifically to the field of augmented reality, and more specifically to a method and apparatus for augmenting reality.

BACKGROUND

At present, in some navigation applications, the function of presenting labeling information on a part of the building block photographed by a user is provided. At present, the typically presentation method is to manually preset a superimposed position on the building block for labeling the labeling information, and the labeling information can be presented only when the superimposed position of the labeling information on the building block is within the viewing angle of the camera on the user's terminal. It occurs frequently that only a part of a large-sized building block can be captured at the user's location but a preset superimposed position is not in the captured part, and then the labeling information cannot be presented to the user. In addition, an overlap between the labeling information of a plurality of pre-set building blocks may occur, and then labeling information cannot be clearly presented.

SUMMARY

Embodiments of the present disclosure provide a method and apparatus for augmenting reality.

In a first aspect, the embodiments of the present disclosure provide a method for augmenting reality, including: acquiring outline data of a plurality of building blocks satisfying a preset selection condition, the outline data being used to describe an outline of a building block in three-dimensional space; generating reference information based on projected line segments of the plurality of building blocks, a projected line segment of the building block being obtained by mapping the outline of the building block in three-dimensional space to a plane a screen of a user's terminal located thereon, the reference information being used to describe whether there is occlusion between building blocks in the plurality of building blocks in a horizontal direction and an occlusion situation in response to there being the occlusion; determining, based on the reference information, a target building block in the plurality of building blocks and a superimposed region in an image acquired by the user's terminal, labeling information of the target building block being superimposed on the superimposed region; and superimposing the labeling information of the target building block on the determined superimposed region to obtain an augmented reality image.

In a second aspect, the embodiments of the present disclosure provide an apparatus for augmenting reality, including: an acquisition unit, configured to acquire outline data of a plurality of building blocks satisfying a preset selection condition, the outline data being used to describe an outline of a building block in three-dimensional space; a generation unit, configured to generate reference information based on projected line segments of the plurality of building blocks, a projected line segment of the building block being obtained by mapping the outline of the building block in three-dimensional space to a plane a screen of a user's terminal located thereon, the reference information being used to describe whether there is occlusion between building blocks in the plurality of building blocks in a horizontal direction and an occlusion situation in response to there being the occlusion; a determining unit, configured to determine, based on the reference information, a target building block in the plurality of building blocks and a superimposed region in an image acquired by the user's terminal, labeling information of the target building block being superimposed on the superimposed region; and a presenting unit, configured to superimpose the labeling information of the target building block on the determined superimposed region, to obtain an augmented reality image.

The method and apparatus for augmenting reality provided by the embodiments of the present disclosure, acquire outline data of a plurality of building blocks satisfying a preset selection condition, the outline data being used to describe an outline of a building block in three-dimensional space; generate reference information based on projected line segments of the plurality of building blocks, a projected line segment of the building block being obtained by mapping the outline of the building block in three-dimensional space to a plane a screen of a user's terminal located thereon, the reference information being used to describe whether there is occlusion between building blocks in the plurality of building blocks in a horizontal direction and an occlusion situation in response to there being the occlusion; determine, based on the reference information, a target building block in the plurality of building blocks and a superimposed region in an image acquired by the user's terminal, labeling information of the target building block being superimposed on the superimposed region; and superimpose the labeling information of the target building block on the determined superimposed region, to obtain an augmented reality image. It is realized that when the camera on the user's terminal photographs a building block at various viewing angles or only captures a part of the building block, labeling information of the building block may be displayed in the acquired image for augmenting reality, and it may be ensured that there is no overlap between the labeling information of a plurality of building blocks, and the labeling information may be clearly presented.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
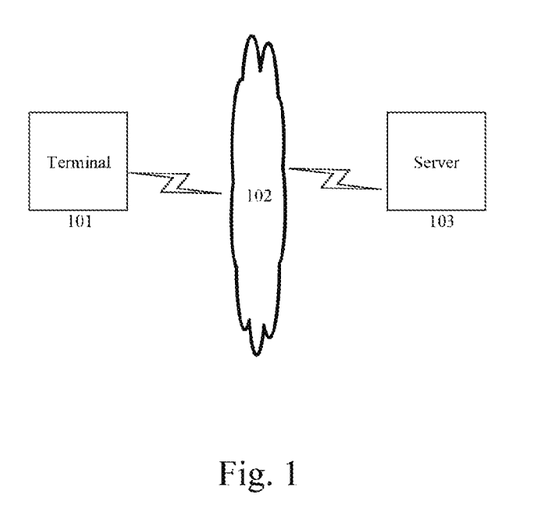
FIG. 1 illustrates an exemplary system architecture diagram suitable for implementing an embodiment of the present disclosure.

With reference to FIG. 1, illustrating an exemplary system architecture suitable for implementing an embodiment of the present disclosure.

As shown in FIG. 1, the system architecture includes a terminal 101, a network 102, and a server 103. The network 102 may be a wired communication network or a wireless communication network.

The server 103 may be a server that provides an electronic map service. The server 103 correspondingly pre-stores outline data of a plurality of building blocks. The outline data of the building blocks may be the outline data of the building blocks on the ground plane. The terminal 101 may acquire outline data of a plurality of building blocks in the vicinity of a user of the terminal 101 from the server 103.

Figure 2:
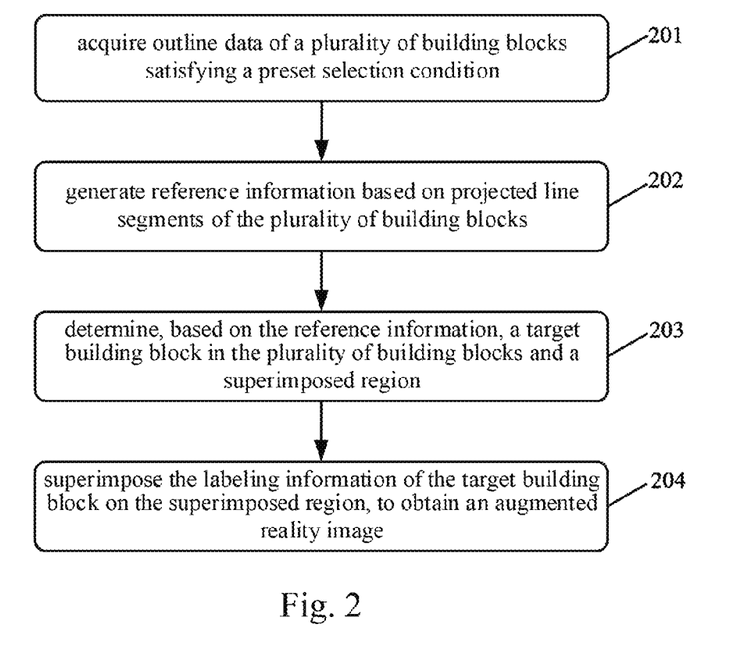
FIG. 2 illustrates a flowchart of an embodiment of a method for augmenting reality according to the present disclosure.

With reference to FIG. 2, which illustrates a flow of an embodiment of a method for augmenting reality according to the present disclosure. The method for augmenting reality provided by the embodiment of the present disclosure may be executed by a terminal (for example, the terminal 101 in FIG. 1). The method includes the following steps:

Step 201, acquiring outline data of a plurality of building blocks satisfying a preset selection condition.

In the present embodiment, the building block may be an office building, a shopping mall, a residential building, or the like. When the camera on the user's terminal is turned on and the user uses the function of augmenting the presentation of labeling information of some building blocks in an image acquired by the camera on the user's terminal, outline data of a plurality of building blocks satisfying a preset selection condition may be first acquired. The preset selection condition may include: large building blocks that are at least partially located within the viewing angle of the camera on the user's terminal and having orders less than a preset order when the distances to the user are sorted from near to far. In other words, acquiring outline data of a plurality of large building blocks closest to the user and located at least partially within the viewing angle of the camera on the user's terminal. Each of the plurality of building blocks is at least partially located in the image acquired by the camera on the user's terminal.

The user's terminal may send the location of the user and the shooting angle of the camera on the user's terminal to the server providing the electronic map service, and the server providing the electronic map service pre-stores outline data of massive building blocks, and the outlines of the massive building blocks in an electronic map. The server providing the electronic map service may find out, based on the location of the user and the shooting angle of the camera on the user's terminal, the large building blocks that are at least partially located within the viewing angle of the camera on the user's terminal and having orders less than the preset order when the distances to the user sorted from near to far, and in turn acquire the outline data of the found large building blocks. The outline data of the building block describes the outline of the building block on the ground plane in three-dimensional space.

In the present embodiment, the labeling information of the building block may include a labeling box, a name of the building block in the labeling box, and a distance between the building block and the user. The shape of the labeling box may be a rectangle, a bubble, or the like.

Step 202, generating reference information based on projected line segments of the plurality of building blocks.

In the present embodiment, after the outline data of the plurality of building blocks satisfying the preset selection condition is acquired, the outlines of the plurality of building blocks in three-dimensional space may be determined. First, for each building block in the plurality of building blocks, the outline of each of the building block in three-dimensional space may be respectively mapped to the plane of the screen of the user's terminal to obtain line segments respectively corresponding to each of the building blocks. The length of the one line segment corresponding to a building block is the real length in three-dimensional space, and the real lengths needs to be converted into the lengths on the screen of the user's terminal to obtain projected line segments of the building blocks on the screen of the user's terminal. In other words, it is equivalent to mapping the outlines of the building blocks in three-dimensional space to the screen of the user's terminal to obtain the projected line segments of each of the building blocks.

In the present embodiment, when the outline in three-dimensional space of a building block is mapped to the screen of the user's terminal, three-dimensional coordinates in the world coordinate system of the three-dimensional point in three-dimensional space on the outline of the building block may be converted into corresponding two-dimensional coordinates in the two-dimensional coordinate system on the screen of the user's terminal, thereby determining the corresponding two-dimensional point on the screen of the user's terminal of the three-dimensional point in three-dimensional space on the outline of the building block. All of the two-dimensional points corresponding to the three-dimensional points are located on the same horizontal line, and the two-dimensional points closest to the two ends of the screen of the user's terminal in the horizontal direction respectively serve as the end points of ends of the projected line segment, thereby forming the projected line segment of the building block.

For example, when mapping the outline of the building block in three-dimensional space to the screen of the user's terminal, the MVP (Model View Projection) algorithm provided by OpenGL (Open Graphics Library) may be used to convert the three-dimensional coordinates in the world coordinate system of the three-dimensional point on the outline of the building block in three-dimensional space into the corresponding two-dimensional coordinates in the two-dimensional coordinate system on the screen of the user's terminal, thereby mapping the outline of the building block in three-dimensional space to the screen of the user's terminal to obtain the projected line segment of the building block.

In the present embodiment, for each of the building blocks, when the outline of the building block in three-dimensional space is mapped to the screen of the user's terminal, the outline of each of the building blocks in three-dimensional space may be respectively mapped to the plane of the screen of the user's terminal at the same height in three-dimensional space, to obtain line segments corresponding to each of the building blocks, and then the line segments are converted into the lengths on the screen of the user's terminal, to obtain the projected line segments for building blocks on the screen of the user's terminal. Accordingly, the projected line segments of the building blocks on the screen of the user's terminal are on the same horizontal line.

In the present embodiment, when the same building block are shot using a plurality of terminals of different screen widths, the maximum true length of the building block in the horizontal direction and the maximum length of the building block in the horizontal direction on the screen may be predetermined. The maximum true length in the horizontal direction is the distance between the point where the abscissa is the smallest and the point where the abscissa is the largest on the outline of the building block in three-dimensional space. A maximum length of the building block in the horizontal direction on the screen is the distance between the pixel having the smallest abscissa and the pixel having the largest abscissa on the outline of the building block in the image. For each screen of a width, the ratio obtained by dividing the maximum length of the building block in the horizontal direction on the screen by the maximum true length of the building block in the horizontal direction may be used as the ratio corresponding to the screen. After the outline of a building block in three-dimensional space is mapped into the plane of the screen of the user's terminal to obtain the line segment corresponding to the building block, the real length of the corresponding line segment of the building block in three-dimensional space may be multiplied by the ratio corresponding to the screen of the terminal to obtain the length of the projected line segment of the building block.

In the present embodiment, reference information may be generated based on projected line segments of the respective blocks of the plurality of building blocks. The reference information may describe whether a building block is occluded by other building blocks in the horizontal direction, and the occlusion situation when occluded, the occlusion situation may be partially occlusion or completely occlusion.

In the present embodiment, whether a building block is occluded by other building blocks means whether the building block is occluded by other building blocks whose distance to the user is smaller than the distance of the building block to the user. In other words, whether a building block is occluded by other building blocks means whether the building block is occluded by other building blocks located in front of the building block.

In the present embodiment, after the outlines of the plurality of building blocks in three-dimensional space are mapped into the screen of the user's terminal and the projected line segments of the respective building blocks are obtained, based on the projected line segments of the respective building blocks, for each of the building blocks, it may be determined whether the building block is occluded by other building blocks located in front of the building block, in response to the building block being occluded, it may be further determined whether the occlusion situation is partially occlusion or completely occlusion.

In the present embodiment, when determining, based on the projected line segments of the building blocks, whether a building block is occluded by other building blocks located in front of the building block and when the building block is occluded, whether the occlusion situation is partially occlusion or completely occlusion is further determined, and then reference information may be generated to describe whether each of the building blocks is occluded by other building blocks located in front of the building block, and the occlusion situation in response to an occlusion.

In the present embodiment, for a building block in the plurality of building blocks, based on the projected line segment of the building block and the projected line segment of one of the other building blocks located in front of the building block, whether the building block is occluded in the horizontal direction by one of the other building blocks and the occlusion situation when an occlusion occurs. When the projected line segment of the building block is on the same horizontal line as the projected line segment of the other building block, if the projected line segment of the building block does not have a same sub-line segment as the projected line segment of the other building block, then the building block is not occluded by the other building block. When the projected line segment of the building block is on the same horizontal line as the projected line segment of the other building block, and the projected line segment of the building block and the projected line segment of the other building block have a same sub-line segment while the projected line segment of the building block has a sub-line segment that the other building block does not have, the building block is partially occluded by the other building block. When the projected line segment of the building block is on the same horizontal line as the projected line segment of the other building block, and the projected line segment of the building block becomes a sub-line segment of the projected line segment of the other building block, the building block is completely occluded by the other building block.

Step 203, determining, based on the reference information, a target building block in the plurality of building blocks and a superimposed region.

In the present embodiment, the building block whose labeling information is to be presented in the image acquired by the user's terminal is the target building block. A building block that is completely occluded by at least one building block in the plurality of building blocks may be first determined, and then building blocks other than the building block completely occluded by at least one building block in the plurality of building blocks, i.e., a building block that is not completely occluded by any one of the building blocks is determined as a target building block. The building block closest to the user is not completely occluded by any one of the building blocks, and the building block closest to the user is a target building block. In other words, the labeling information presented to the user includes: labeling information of each target building block, that is, a building block that is not completely occluded by any one of the building blocks.

In the present embodiment, the labeling information of the building block may include a labeling box and a name of the building block in the labeling box. The shape of the labeling box may be a rectangle, a bubble, or the like. The shapes and areas of the labeling boxes of the building blocks are the same.

In the present embodiment, since the name of the building block and the distance to the user are presented to the user in the labeling box in the labeling information of the building block, a superimposed region of the labeling information of the building block in the image acquired by the user's terminal may correspond to a region occupied by the labeling box in the labeling information of the building block in the image acquired by the user's terminal. Determining the superimposed region of the labeling information of the building block in the image acquired by the user's terminal is equivalent to determining the region occupied by the labeling box in the labeling information of the building block in the image acquired by the user's terminal. The center point of the superimposed region of the labeling information of each target building block may correspond to the center point of the labeling box of the labeling information of each target building block.

The abscissa value of the center point of the labeling box of the labeling information of each target building block may be first determined. The abscissa value may be an abscissa value in a coordinate system, the coordinate system uses a corner point of the screen of the user's terminal, for example, the lower left corner as the origin of the coordinate system. The abscissa values of the center points of the labeling boxes in the labeling information of the respective target building blocks should ensure that the labeling boxes in the labeling information of any two target building blocks in all the target building blocks do not overlap in the horizontal direction. The labeling boxes in the labeling information of any two target building blocks do not overlap in the horizontal direction may be equivalent to that, when the center points of the labeling boxes in the labeling information of any two target building blocks are located on the same horizontal line, the labeling boxes in the labeling information of any two target building blocks do not overlap in the horizontal direction.

After determining the abscissa values of the center points of the labeling boxes in the labeling information of the respective target building blocks, the ordinates of the center points of the labeling boxes in the labeling information of the respective target building block may be determined. The ordinates of the center points of the labeling boxes in the labeling information of the respective target building blocks should ensure that the labeling boxes in the labeling information of any two target building blocks in all the target building blocks do not overlap in the vertical direction. The labeling boxes in the labeling information of any two target building blocks in all the target building blocks do not overlap in the vertical direction may be equivalent to that, when the center points of the labeling boxes in the labeling information of any two target building blocks are located on the same vertical line, the labeling boxes in the labeling information of any two target building blocks do not overlap in the vertical direction.

After determining the abscissas and the ordinates of the center points of the labeling boxes in the labeling information of the respective target building blocks, the positions of the center points of the labeling boxes in the labeling information of the respective target building block may be obtained. The regions in the image acquired by the user's terminal occupied by the labeling boxes in the labeling information of the respective target building blocks having the same shape and area may be further determined, thereby the superimposed regions of the labeling information of the respective target building blocks are determined in the image acquired by the user's terminal.

In some alternative implementations of the present embodiment, when a building block closest to the user in the plurality of building blocks completely occludes all of the other building blocks, based on the length of the projected line segment of the building block closest to the user is greater than the width of the screen, it may be determined that the building block closest to the user in the plurality of building blocks completely occludes all of the other building blocks, and an indication indicating that the building block closest to the user in the plurality of building blocks completely occludes all of the other building blocks in the horizontal direction may be generated. Correspondingly, the reference information includes: an indication indicating that the building block closest to the user in the plurality of building blocks completely occludes all other building blocks in the horizontal direction. When a target building block in the plurality of building blocks and a superimposed region of labeling information of the target building block in an image acquired by the user's terminal are determined, the building block closest to the user may be determined as the target building block. In other words, only the labeling information of the building block closest to the user is presented to the user. The abscissa of the center point of the projected line segment of the building block closest to the user may be determined as the abscissa of the center point in the superimposed region of the labeling information of the building block closest to the user in the image. Then, the ordinate of the center point of the superimposed region of the labeling information of the building block closest to the user in the image may be determined, and the position of the center point of the labeling box in the labeling information of the building block closest to the user may be determined.

In some alternative implementations of the present embodiment, when a building block that is completely occluded by at least one building block and a building block that is not completely occluded by any one of the building blocks in the horizontal direction are included in the plurality of building blocks, the building block that is completely occluded by at least one building block and the building block that is not completely occluded by any one of the building blocks in the horizontal direction included in the plurality of building blocks may be determined based on the projected line segment of each building block. The generated reference information further includes: an identification of a building block that is completely occluded by at least one building block in the plurality of building blocks in the horizontal direction and an identification of a building block that is not completely occluded by any one of the building blocks in the plurality of building blocks.

When determining to-be-presented labeling information and a superimposed region of the to-be-presented labeling information in the image acquired by the user's terminal based on the reference information, each of the building block that is completely occluded by at least one building block and the building block that is not completely occluded by any one of the building blocks in the plurality of building blocks may be determined based on the identification of the building block that is completely occluded by at least one building block in the horizontal direction and the identification of the building block that is not completely occluded by any one of the building blocks in the reference information. Then, the building block that is not completely occluded by any one of the building blocks in the horizontal direction may be determined as the target building block. The number of the target building blocks may be more than one.

According to a first occlusion correlation between the closest building block and a second closest building block in the target building blocks, a superimposed region of labeling information of the closest building block and a superimposed region of labeling information of the next closest building block in the image acquired by the user's terminal may be first determined. The closest building block is a target building block that is closest to the user in all target building blocks, and the second closest building block is a target building block with a second closest distance to the user in all the target building blocks. The first occlusion correlation may be: the second closest building block is not occluded by the closest building block, the second closest building block is partially occluded by the closest building block and the part of the second closest building block that is not occluded by the closest building block is located on one side of the closest building block, and the second closest building block is partially occluded by the closest building block and the part of the second closest building block that is not occluded by the closest building block is distributed on both sides of the closest building block.

When the projected line segment of the closest building block is on the same horizontal line as the projected line segment of the second closest building block, if the projected line segment of the second closest building block has no identical sub-line segment with the projected line segment of the closest building block, the second closest building block is not occluded by the closest building block. When the projected line segment of the closest building block is on the same horizontal line as the projected line segment of the second closest building block, if the sub-line segment of the projected line segment of the second closet building block, the sub-line segment not belonging to the closest building block on the projected line segment of the second closest building block, is located on one side (the left side or the right side) of the projected line segment of the closest building block, the second closest building block is partially occluded by the closest building block and the part of the second closest building block that is not occluded by the closest building block is located on one side of the closest building block. When the projected line segment of the closest building block is on the same horizontal line as the projected line segment of the second closest building block, if the two sides of the projected line segment of the closest building block have sub-line segments of the projected line segment not belonging to the closest building block but on the projected line segment of the second closest building block, the second closest building block is partially occluded by the closest building block and the part of the second closest building block that is not occluded by the closest building block is distributed on both sides of the closest building block.

When the first occlusion correlation is that the second closest building block is not occluded by the closest building block, the abscissa of the center point of the projected line segment of the second closest building block may be determined as the abscissa of the center point of the labeling box in the labeling information of the second closest building block. At the same time, the abscissa of the center point of the projected line segment of the closest building block may be determined as the abscissa of the center point of the labeling box in the labeling information of the closest building block.

When the first occlusion correlation is that the second closest building block is partially occluded by the closest building block and the part of the second closest building block that is not occluded is located on one side of the second closest building block, or the second closest building block is partially occluded by the closest building block and the part of the second closest building block that is not occluded is distributed on both sides of the closest building block, the center point of the sub-line segment which is on the projected line segment of the second closest building block but not belonging to the projected line segment of the closest building block is determined as the center point of the labeling box in the labeling information of the second closest building block when the projected line segment of the next closest building block is on the same horizontal line as the projected line segment of the closest building block. At the same time, the abscissa of the center point of the projected line segment of the closest building block is determined as the abscissa of the center point of the labeling box in the labeling information of the closest building block.

After determining the abscissas of the center points of the labeling boxes in the labeling information of the second closest building block and the closest building block, the ordinates of the center points of the labeling boxes in the labeling information of the second closest building block and the closest building block may be determined. The ordinates of the center points of the labeling boxes in the labeling information of the second closest building block and the closest building block may ensure that the labeling box in the labeling information of the second closest building block and the labeling box in the labeling information of the closest building block do not overlap in the vertical direction. After determining the abscissas and the ordinates of the center points of the labeling boxes in the labeling information of the closest building block and the second closest building block, the positions of the center points of the labeling boxes in the labeling information of the closest building block and the second closest building block may be simultaneously determined. Accordingly, the regions in the image acquired by the user's terminal occupied by the labeling boxes in the labeling information of the closest building block and the second closest building block may be determined, that is, the superimposed regions of the labeling information of the closest building block and the second closest building block in the image acquired by the user's terminal are determined.

For each target building block in all target building blocks other than the closest building block and the second closest building block, based on a second occlusion correlation between the target building block and a preceding target building block of the target building block, the superimposed region of the labeling information of the target building block in the image acquired by the user's terminal is determined, that is, the region occupied by the labeling box in the labeling information of the target building block in the image acquired by the user's terminal is determined. The preceding target building block of the target building block, other than the closest building block and the second closest building block, refers to a target building block whose distance to the user is less than the distance between the target building block and the user but larger than the distances between the closest building block and the second closest building block and the user.

The second occlusion correlation between the target building block, other than the closest building block and the second closest building block, and a preceding target building block may be: the target building block is not occluded by the preceding target building block, the target building block is partially occluded by the preceding target building block and the part of the target building block that is not occluded by the preceding target building block is located on one side of the preceding target building block, and the target building block is partially occluded by the preceding target building block and the part of the target building block that is not occluded by the preceding target building block is distributed on both sides of the preceding target building block.

For each target building block other than the closest building block and the second closest building block, the position of the center point of the labeling box in the labeling information of each target building block is sequentially determined according to the distance to the user from near to far.

When determining the position of the center point of the labeling box in the labeling information of a target building block other than the closest building block and the second closest building block, the position of the center point of the labeling box in the labeling information of the preceding target building block of the target building block has been determined, and the center point of the labeling box in the labeling information of the preceding building block that has been determined remains unchanged. When the second occlusion correlation between the target building block and the preceding target building block is that the target building block is not occluded by the preceding building block, the abscissa of the center point of the projected line segment of the target building block may be determined as the abscissa of the center point of the labeling box in the labeling information of the target building block. When the second occlusion correlation between the target building block and the preceding target building block is that the target building block is partially occluded by the preceding target building block and the un-occluded part is on one side of the preceding target building block or distributed on both sides of the preceding target building block, the center point of the sub-line segment on the target building block and not belonging to the projected line segment of the preceding target building block is determined as the center point of the labeling box in the labeling information of the target building block when the target building block is on the same horizontal line as the preceding target building block. After determining the abscissa of the center point of the labeling box in the labeling information of the target building block, the ordinate of the center point of the labeling box in the labeling information of the target building block may be determined. The ordinate of the center point of the labeling box in the labeling information of the target building block may ensure that the labeling box in the labeling information of the target building block does not overlap with the labeling box in the labeling information of the preceding target building block in the vertical direction.

In some alternative implementations of the present embodiment, when the first occlusion correlation between the closest building block and the second closest building block is that the second closest building block is not occluded by the closest building block or the second closest building block is partially occluded by the closest building block and the un-occluded part is distributed on both sides of the closest building block, the abscissa of the center point of the projected line segment of the second closest building block may be determined as the abscissa of the center point of the labeling box in the labeling information of the second closest building block, and at the same time, the abscissa of the center point of the projected line segment of the closest building block may be determined as the abscissa of the center point of the labeling box in the labeling information of the closest building block.

When the first occlusion correlation between the closest building block and the next closest building block is that the second closest building block is partially occluded by the closest building block and the un-occluded part is on one side of the next closest building block, when the projected line segment of the second closest building block is on the same horizontal line as the projected line segment of the closest building block, the center point of the sub-line segment corresponding to the part that is not occluded by the closest building block, that is, the sub-line segment on the projected line segment of the second closest building block but not belonging to projected line segment of the closest building block, is determined as the center point of the labeling box in the labeling information of the second closest building block. At the same time, the abscissa of the center point of the projected line segment of the closest building block is determined as the abscissa of the center point of the labeling box in the labeling information of the closest building block.

In some alternative implementations of the present embodiment, when determining the ordinate of the center point of the superimposed region in the image, all target building blocks may be sorted according to the distance to the user, and based on the order of each target building block after the sorting, the ordinate of the center point of the superimposed region of the labeling information of each target building block in the image acquired by the user's terminal is determined, that is, the labeling box in the labeling information of each target building block is determined.

The target building blocks may be sorted according to the distance to the user from near to far, and the lower the order of a target building block, the larger the numerical value of the ordinate. In other words, the lower the order of a target building block, the higher the position of the labeling box in the labeling information of the target building block on the screen of the user's terminal. The ordinate of the center point of the superimposed region of the labeling information of each target building block in the image acquired by the user's terminal may ensure that the labeling boxes in the labeling information of any two target building blocks do not overlap in the vertical direction.

The height in the image of each target building block in the image acquired by the user's terminal may be roughly determined based on the outline of the building block or other features of the building block, etc., thereby the value of the maximum ordinate of the labeling box in the labeling information of the target building block may be further determined. The determined ordinate of the center point of the labeling box in the labeling information of the target building block is smaller than the value of the ordinate which should be smaller than the maximum ordinate. In other words, if the determined ordinate of the center point of the labeling box in the labeling information of the target building block is larger than the value of the maximum ordinate, the part of the labeling box in the labeling information of the target building block in the image may exceed the highest height of the target building block in the image.

Step 204, superimposing the labeling information of the target building block on the superimposed region to obtain an augmented reality image.

In the present embodiment, after the superimposed region in the image acquired by the user's terminal of each target building block is determined, that is, after the region occupied by the labeling box in the labeling information of each target building block in the image acquired by the user's terminal is determined, the labeling information of the target building block may be superimposed on the determined superimposed region. In other words, the labeling box in the labeling information of each target building block is set in the region occupied by the determined labeling box in the image acquired by the user's terminal. At least part of each target building block is located in the image acquired by the user's terminal, and the labeling box of each target building block is at least partially located in a certain region of the target building block in the image acquired by the user's terminal. Therefore, the image acquired by the user's terminal includes the name of the target building block and the distance between the target building block and the user in the labeling box in the labeling information of each target building block, and then an augmented reality image is obtained. Since that the labeling boxes in the labeling information of any two target building blocks do not overlap in the horizontal direction is determined, the labeling boxes in the labeling information of any two target building blocks do not overlap in the vertical direction, and correspondingly, when presented to the user, the names of the target building blocks and the distance between the target building blocks and the user in the labeling boxes of any two target building blocks in the augmented reality image do not overlap.

Figure 3:
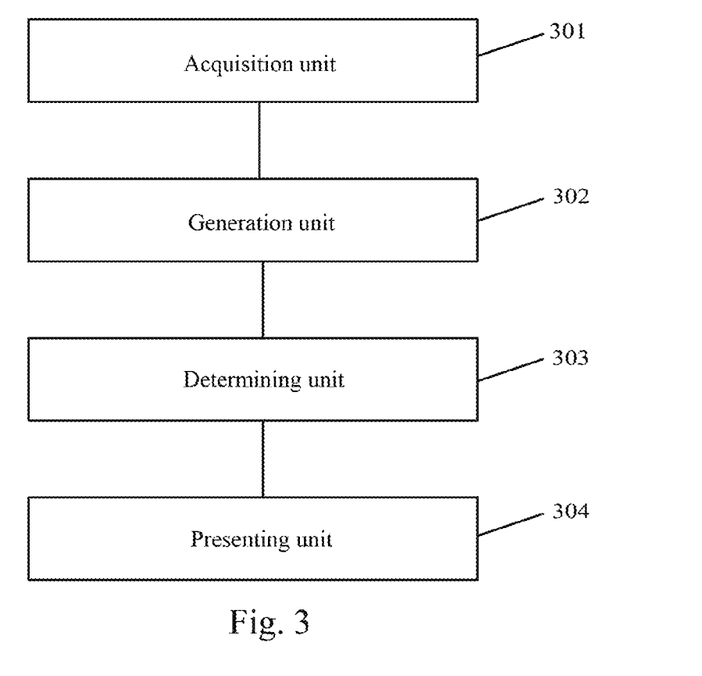
FIG. 3 illustrates a schematic structural diagram of an embodiment of an apparatus for augmenting reality according to the present disclosure.

With reference to FIG. 3, as an implementation of the method shown in the above figures, the present disclosure provides an embodiment of an apparatus, and the apparatus embodiment corresponds to the method embodiment as shown in FIG. 2.

As shown in FIG. 3, the apparatus of the present embodiment includes: an acquisition unit 301, a generation unit 302, a determining unit 303 and a presenting unit 304. The acquisition unit 301 is configured to acquire outline data of a plurality of building blocks satisfying a preset selection condition, the outline data being used to describe an outline of a building block in three-dimensional space. The generation unit 302 is configured to generate reference information based on projected line segments of the plurality of building blocks, a projected line segment of the building block being obtained by mapping the outline of the building block in three-dimensional space to a plane a screen of a user's terminal located thereon, the reference information being used to describe whether there is occlusion between building blocks in the plurality of building blocks in a horizontal direction and an occlusion situation in response to there being the occlusion. The determining unit 303 is configured to determine, based on the reference information, a target building block in the plurality of building blocks and a superimposed region in an image acquired by the user's terminal, labeling information of the target building block being superimposed on the superimposed region. The presenting unit 304 is configured to superimpose the labeling information of the target building block on the determined superimposed region, to obtain an augmented reality image.

In some alternative implementations of the present embodiment, the determining unit includes: a first target building block and superimposed region determining subunit, configured to determine, when the reference information includes an indication indicating that a building block closest to the user in the plurality of building blocks completely occludes all other building blocks in the horizontal direction, the building block closest to the user in the plurality of building blocks as the target building block; and determine in the image, based on a center point of a projected line segment of the building block closest to the user, a center point of the superimposed region of the building block closest to the user.

In some alternative implementations of the present embodiment, the determining unit includes: a second target building block and superimposed region determining subunit, configured to, when the reference information includes an identification of a building block in the plurality of building blocks that is completely occluded by at least one building block in the horizontal direction and an identification of a building block in the plurality of building blocks that is not completely occluded by any one of the building blocks in the plurality of building blocks in the horizontal direction, determine the building block not completely occluded by any one of the building blocks in the horizontal direction as the target building block; determine, according to a first occlusion correlation between a closest building block and a second closest building block, a superimposed region of labeling information of the closest building block in the image and a superimposed region of labeling information of the second closest building block in the image, where the closest building block is a target building block closest to the user in all target building blocks, and the second closest building block is a target building with a second closest distance to the user in all the target building blocks; and determine, for each target building block in all the target building blocks other than the closest building block and the next closest building block, based on a second occlusion correlation between the target building block and a preceding target building block of the target building block, the superimposed region of the labeling information of the target building block in the image.

In some alternative implementations of the present embodiment, the second target building block and superimposed region determining subunit is further configured to determine an abscissa of a center point of a projected line segment of the closest building block as an abscissa of a center point of the superimposed region of the labeling information of the closest building block in the image; determine, in response to the first occlusion correlation being a preset occlusion correlation, an abscissa of a center point of a sub-line segment of the second closest building block as an abscissa of a center point of the superimposed region of the labeling information of the second closest building block in the image, the sub-line segment of the second closest building block corresponding to a part of the second closest building block not occluded by the closest building block, where the preset occlusion correlation includes: the second closest building block is partially occluded by the closest building block and the part of the second closest building block not occluded by the closest building block is located on a side of the closest building block; and determine, in response to the first occlusion correlation being not the preset occlusion correlation, an abscissa of the center point of the projected line segment of the next closest building block as the abscissa of the center point in the superimposed region of the labeling information of the next closest building block in the image.

In some alternative implementations of the present embodiment, the apparatus further includes: an ordinate determining unit, configured to sort all the target building blocks according to a distance to the user; and determine an ordinate of a center point of the superimposed region of labeling information of each target building block in the image, based on an order of each target building block after the sorting.

Figure 4:
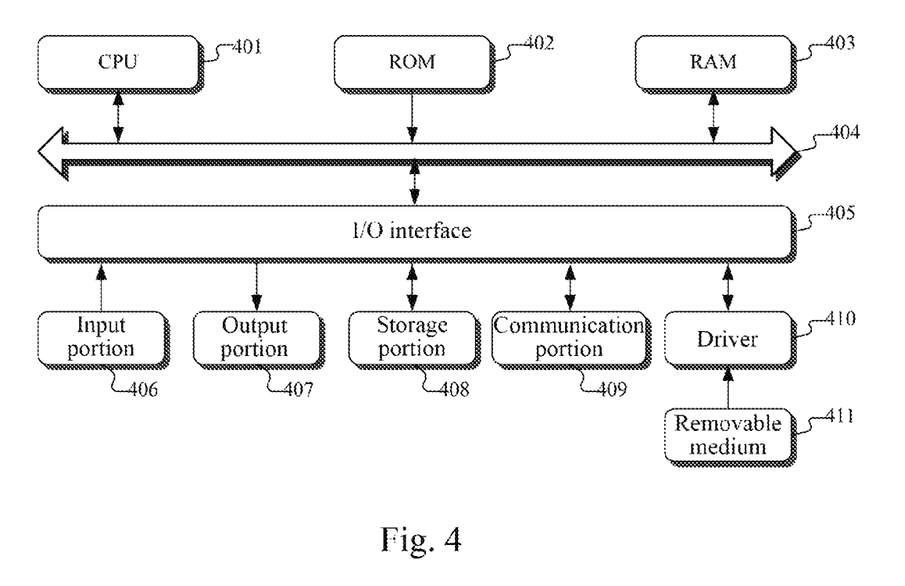
FIG. 4 is a schematic structural diagram of a computer system adapted to implement a terminal of the embodiments of the present disclosure.

FIG. 4 is a schematic structural diagram illustrating a computer system adapted to implement a terminal of the embodiments of the present disclosure.

As shown in FIG. 4, the computer system includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the computer system. The CPU 401, the ROM 402 and the RAM

403 are connected to each other through a bus 404. An input/output (I/O) interface 405 is also connected to the bus 404.

The following components are connected to the I/O interface 405: an input portion 406; an output portion 407; a storage portion 408 including a hard disk and the like; and a communication portion 409 including a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 409, and/or may be installed from the removable medium 411. The computer program, when executed by the central processing unit (CPU) 401, implements the above mentioned functionalities as defined by the method of the present disclosure.

The present disclosure also provides a terminal. The terminal may be configured with one or more processors; a storage apparatus, for storing one or more programs, and the one or more programs may include instructions for performing the operations described in the above embodiments. The one or more programs, when executed by the one or more processors, cause the one or more processors to perform the operations described in the above embodiments.

The present disclosure further provides a computer readable medium. The computer readable medium may be included in the terminal, or a stand-alone computer readable medium not assembled into the terminal. The computer readable medium stores one or more programs. The one or more programs, when executed by the server, cause the terminal to: acquire outline data of a plurality of building blocks satisfying a preset selection condition, the outline data being used to describe an outline of a building block in three-dimensional space; generate reference information based on projected line segments of the plurality of building blocks, a projected line segment of the building block being obtained by mapping the outline of the building block in three-dimensional space to a plane a screen of a user's terminal located thereon, the reference information being used to describe whether there is occlusion between building blocks in the plurality of building blocks in a horizontal direction and an occlusion situation in response to there being the occlusion; determine, based on the reference information, a target building block in the plurality of building blocks and a superimposed region in an image acquired by the user's terminal, labeling information of the target building block being superimposed on the superimposed region; and superimpose the labeling information of the target building block on the determined superimposed region, to obtain an augmented reality image.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a message execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a message execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable messages for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer messages.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for augmenting reality, the method comprising:
acquiring outline data of a plurality of building blocks satisfying a preset selection condition, the outline data being used to describe outlines of the plurality of building blocks in three-dimensional space;
generating reference information based on projected line segments of the plurality of building blocks, the projected line segments of the plurality of building blocks being obtained by mapping the outlines of the plurality of building blocks in three-dimensional space to a plane of a screen of a terminal located thereon, the reference information being used to describe whether there is occlusion between building blocks in the plurality of building blocks in a horizontal direction and an occlusion situation in response to there being the occlusion;
determining, based on the reference information, target building blocks in the plurality of building blocks and superimposed regions in an image acquired by the terminal, labeling information of the target building blocks being superimposed on the superimposed regions; and
superimposing the labeling information of the target building blocks on the determined superimposed regions, to obtain an augmented reality image,
wherein the reference information comprises: an identification of a building block in the plurality of building blocks that is completely occluded by at least one building block in the horizontal direction and identifications of building blocks in the plurality of building blocks that are not completely occluded by any one of the building blocks in the horizontal direction, and the determining, based on the reference information, target building blocks in the plurality of building blocks and superimposed regions in an image acquired by the terminal, labeling information of the target building blocks being superimposed on the superimposed regions comprises:
determining the building blocks that are not completely occluded by any one of the building blocks in the horizontal direction as the target building blocks; and
determining, according to a first occlusion correlation between a closest building block and a second closest building block, a superimposed region of labeling information of the closest building block in the image and a superimposed region of labeling information of the second closest building block in the image, wherein the closest building block is a target building block closest to the terminal in all the target building blocks, and the second closest building block is a target building block with a second closest distance to the terminal in all the target building blocks.

2. The method according to claim 1, wherein the reference information further comprises: an indication indicating that the closest building block completely occludes all other building blocks in the horizontal direction; and
the determining, based on the reference information, target building blocks in the plurality of building blocks and superimposed regions in an image acquired by the terminal, labeling information of the target building blocks being superimposed on the superimposed regions comprises:
determining the building block closest to the terminal in the plurality of building blocks as a target building block; and
determining in the image, based on a center point of a projected line segment of the building block closest to the terminal, a center point of a superimposed region of the building block closest to the terminal.

3. The method according to claim 1, wherein
the determining, based on the reference information, target building blocks in the plurality of building blocks and superimposed regions in an image acquired by the terminal, labeling information of the target building blocks being superimposed on the superimposed regions further comprises:
determining, for each target building block in all the target building blocks other than the closest building block and the second closest building block, based on a second occlusion correlation between the each target building block and a preceding target building block of the each target building block, a superimposed region of the labeling information of the each target building block in the image.

4. The method according to claim 1, wherein the determining, according to a first occlusion correlation between a closest building block and a second closest building block, a superimposed region of labeling information of the closest building block in the image and a superimposed region of labeling information of the second closest building block in the image comprises:
determining an abscissa of a center point of a projected line segment of the closest building block as an abscissa of a center point of the superimposed region of the labeling information of the closest building block in the image;
determining, in response to the first occlusion correlation being a preset occlusion correlation, an abscissa of a center point of a sub-line segment of the second closest building block as an abscissa of a center point of the superimposed region of the labeling information of the second closest building block in the image, the sub-line segment of the second closest building block corresponding to a part of the second closest building block not occluded by the closest building block, wherein the preset occlusion correlation comprises: the second closest building block is partially occluded by the closest building block and the part of the second closest building block not occluded by the closest building block is located on a side of the closest building block; and
determining, in response to the first occlusion correlation being not the preset occlusion correlation, an abscissa of a center point of the projected line segment of the second closest building block as the abscissa of the center point in the superimposed region of the labeling information of the next closest building block in the image.

5. The method according to claim 4, the method further comprising:
sorting all the target building blocks according to a distance to the terminal; and
determining an ordinate of a center point of the superimposed region of labeling information of each target building block in the image, based on an order of each target building block after the sorting.

6. An apparatus for augmenting reality, the apparatus comprising:
at least one processor; and a memory storing instructions, the instructions when executed by the at least one processor, cause the at least one processor to perform operations, the operations comprising:

acquiring outline data of a plurality of building blocks satisfying a preset selection condition, the outline data being used to describe outlines of the plurality of building blocks in three-dimensional space;

generating reference information based on projected line segments of the plurality of building blocks, the projected line segments of the plurality of building blocks being obtained by mapping the outlines of the plurality of building blocks in three-dimensional space to a plane of a screen of a terminal located thereon, the reference information being used to describe whether there is occlusion between building blocks in the plurality of building blocks in a horizontal direction and an occlusion situation in response to there being the occlusion;

determining, based on the reference information, target building blocks in the plurality of building blocks and superimposed regions in an image acquired by the terminal, labeling information of the target building blocks being superimposed on the superimposed regions; and superimposing the labeling information of the target building blocks on the determined superimposed regions, to obtain an augmented reality image, wherein the reference information comprises: an identification of a building block in the plurality of building blocks that is completely occluded by at least one building block in the horizontal direction and identifications of building blocks in the plurality of building blocks that are not completely occluded by any one of the building blocks in the horizontal direction, and the determining, based on the reference information, target building blocks in the plurality of building blocks and superimposed regions in an image acquired by the terminal, labeling information of the target building blocks being superimposed on the superimposed regions comprises:

determining the building blocks that are not completely occluded by any one of the building blocks in the horizontal direction as the target building blocks; and     determining, according to a first occlusion correlation between a closest building block and a second closest building block, a superimposed region of labeling information of the closest building block in the image and a superimposed region of labeling information of the second closest building block in the image, wherein the closest building block is a target building block closest to the terminal in all the target building blocks, and the second closest building block is a target building block with a second closest distance to the terminal in all the target building blocks.

7. The apparatus according to claim 6, wherein reference information further comprises: an indication indicating that the closest building block completely occludes all other building blocks in the horizontal direction; and the determining, based on the reference information, target building blocks in the plurality of building blocks and superimposed regions in an image acquired by the terminal, labeling information of the target building blocks being superimposed on the superimposed regions comprises:

determining the building block closest to the terminal in the plurality of building blocks as a target building block; and determining in the image, based on a center point of a projected line segment of the building block closest to the terminal, a center point of the superimposed region of the building block closest to the terminal.

8. The apparatus according to claim 6, wherein the determining, based on the reference information, target building blocks in the plurality of building blocks and superimposed regions in an image acquired by the terminal, labeling information of the target building blocks being superimposed on the superimposed regions further comprises:

determining, for each target building block in all the target building blocks other than the closest building block and the second closest building block, based on a second occlusion correlation between the each target building block and a preceding target building block of the each target building block, a superimposed region of the labeling information of the each target building block in the image.

9. The apparatus according to claim 6, wherein the determining, according to a first occlusion correlation between a closest building block and a second closest building block, a superimposed region of labeling information of the closest building block in the image and a superimposed region of labeling information of the second closest building block in the image further comprises:

determining an abscissa of a center point of a projected line segment of the closest building block as an abscissa of a center point of the superimposed region of the labeling information of the closest building block in the image;

determining, in response to the first occlusion correlation being a preset occlusion correlation, an abscissa of a center point of a sub-line segment of the second closest building block as an abscissa of a center point of the superimposed region of the labeling information of the second closest building block in the image, the sub-line segment of the second closest building block corresponding to a part of the second closest building block not occluded by the closest building block, wherein the preset occlusion correlation comprises: the second closest building block is partially occluded by the closest building block and the part of the second closest building block not occluded by the closest building block is located on a side of the closest building block; and determining, in response to the first occlusion correlation being not the preset occlusion correlation, an abscissa of the center point of the projected line segment of the next closest building block as the abscissa of the center point in the superimposed region of the labeling information of the next closest building block in the image.

10. The apparatus according to claim 9, the operations further comprising:

sorting all the target building blocks according to a distance to the terminal; and determining an ordinate of a center point of the superimposed region of labeling information of each target building block in the image, based on an order of each target building block after the sorting.

11. A non-transitory computer readable medium, storing a computer program thereon, wherein the program, when executed by a processor, causes the processor to perform operations, the operations comprising:

acquiring outline data of a plurality of building blocks satisfying a preset selection condition, the outline data being used to describe outlines of the plurality of building blocks in three-dimensional space;

generating reference information based on projected line segments of the plurality of building blocks, the projected line segments of the plurality of building blocks being obtained by mapping the outlines of the plurality of building blocks in three-dimensional space to a plane of a screen of a terminal located thereon, the reference information being used to describe whether there is occlusion between building blocks in the plurality of building blocks in a horizontal direction and an occlusion situation in response to there being the occlusion;

determining, based on the reference information, target building blocks in the plurality of building blocks and superimposed regions in an image acquired by the terminal, labeling information of the target building blocks being superimposed on the superimposed regions; and superimposing the labeling information of the target building blocks on the determined superimposed regions, to obtain an augmented reality image, wherein the reference information comprises: an identification of a building block in the plurality of building blocks that is completely occluded by at least one building block in the horizontal direction and identifications of building blocks in the plurality of building blocks that are not completely occluded by any one of the building blocks in the horizontal direction, and the determining, based on the reference information, target building blocks in the plurality of building blocks and superimposed regions in an image acquired by the terminal, labeling information of the target building blocks being superimposed on the superimposed regions comprises:

determining the building blocks that are not completely occluded by any one of the building blocks in the horizontal direction as the target building blocks; and determining, according to a first occlusion correlation between a closest building block and a second closest building block, a superimposed region of labeling information of the closest building block in the image and a superimposed region of labeling information of the second closest building block in the image, wherein the closest building block is a target building block closest to the terminal in all the target building blocks, and the second closest building block is a target building block with a second closest distance to the terminal in all the target building blocks.

12. The medium according to claim 11, wherein the reference information further comprises: an indication indicating that the closest building block completely occludes all other building blocks in the horizontal direction; and the determining, based on the reference information, target building blocks in the plurality of building blocks and superimposed regions in an image acquired by the terminal, labeling information of the target building blocks being superimposed on the superimposed regions comprises:

determining the building block closest to the terminal in the plurality of building blocks as a target building block; and determining in the image, based on a center point of a projected line segment of the building block closest to the terminal, a center point of a superimposed region of the building block closest to the terminal.

13. The medium according to claim 11, wherein the determining, based on the reference information, target building blocks in the plurality of building blocks and superimposed regions in an image acquired by the terminal, labeling information of the target building blocks being superimposed on the superimposed regions further comprises:

determining, for each target building block in all the target building blocks other than the closest building block and the second closest building block, based on a second occlusion correlation between the each target building block and a preceding target building block of the each target building block, a superimposed region of the labeling information of the each target building block in the image.

14. The medium according to claim 1, wherein the determining, according to a first occlusion correlation between a closest building block and a second closest building block, a superimposed region of labeling information of the closest building block in the image and a superimposed region of labeling information of the second closest building block in the image comprises:

determining an abscissa of a center point of a projected line segment of the closest building block as an abscissa of a center point of the superimposed region of the labeling information of the closest building block in the image;

determining, in response to the first occlusion correlation being a preset occlusion correlation, an abscissa of a center point of a sub-line segment of the second closest building block as an abscissa of a center point of the superimposed region of the labeling information of the second closest building block in the image, the sub-line segment of the second closest building block corresponding to a part of the second closest building block not occluded by the closest building block, wherein the preset occlusion correlation comprises: the second closest building block is partially occluded by the closest building block and the part of the second closest building block not occluded by the closest building block is located on a side of the closest building block; and determining, in response to the first occlusion correlation being not the preset occlusion correlation, an abscissa of a center point of the projected line segment of the second closest building block as the abscissa of the center point in the superimposed region of the labeling information of the next closest building block in the image.

15. The medium according to claim 14, the operations further comprising:

sorting all the target building blocks according to a distance to the terminal; and determining an ordinate of a center point of the superimposed region of labeling information of each target building block in the image, based on an order of each target building block after the sorting.

* * * * *